United States Patent [19]

Funami

[11] Patent Number: 5,389,018
[45] Date of Patent: Feb. 14, 1995

[54] TILT CYLINDER UNIT FOR OUTBOARD ENGINE

[75] Inventor: Yasuo Funami, Saitama, Japan

[73] Assignee: Showa Corporation, Saitama, Japan

[21] Appl. No.: 52,750

[22] Filed: Apr. 27, 1993

[30] Foreign Application Priority Data

Apr. 27, 1992 [JP] Japan .................. 4-131325

[51] Int. Cl.$^6$ .............................................. B63H 5/12
[52] U.S. Cl. ...................................... 440/61; 188/300
[58] Field of Search ............... 440/52, 53, 61, 63; 188/300, 314, 318; 267/64.12

[56] References Cited

U.S. PATENT DOCUMENTS

| | | |
|---|---|---|
| 3,599,594 | 8/1971 | Taipale . |
| 4,091,897 | 5/1978 | Andrepont .................. 188/314 |
| 4,493,659 | 1/1985 | Iwashita ...................... 440/61 |
| 4,521,202 | 6/1985 | Nakahama .................. 440/61 |
| 4,545,769 | 10/1985 | Nakahama et al. .......... 440/61 |
| 4,551,104 | 11/1985 | Iwashita et al. ............. 440/56 |
| 4,575,342 | 3/1986 | Nakahama et al. .......... 440/56 |
| 4,605,377 | 8/1986 | Wenstadt .................... 440/61 |
| 4,784,625 | 11/1988 | Nakahama .................. 440/61 |
| 4,925,411 | 5/1990 | Burmeister et al. ......... 440/61 |

FOREIGN PATENT DOCUMENTS 62-267561 11/1987 Japan .

*Primary Examiner*—Jesus D. Sotelo
*Attorney, Agent, or Firm*—Howard L. Rose

[57] ABSTRACT

A tilt cylinder unit for use with an outboard engine on a boat hull has a cylinder, a piston slidably disposed in the cylinder, and a rod having an end coupled to the piston. The cylinder may be coupled to the outboard engine or the boat hull, and the rod may be coupled to the boat hull or the outboard engine. The cylinder has a first chamber which is expanded when the tilt cylinder unit is extended and a second chamber which is compressed when the tilt cylinder unit is contracted, the first and second chambers being defined in the cylinder by the piston. A third chamber, which may be defined in the cylinder or an auxiliary tank separate from the cylinder has a portion filled with a gas. The second and third chambers are interconnected by an orifice, and the first, second, and third chambers are interconnected by a plurality of communication passages. A manually operable valve is coupled between the communication passages for selectively opening and closing the communication passages simultaneously.

4 Claims, 6 Drawing Sheets

TILT CYLINDER UNIT FOR OUTBOARD ENGINE

BACKGROUND OF THE INVENTION

1. Field of the Invention

The present invention relates to a tilt cylinder unit for locking an outboard engine on a boat hull or unlocking the outboard engine from the boat hull under strong forces applied thereto.

2. Description of the Prior Art

Some small power-driven boats such as motor boats have an outboard engine vertically angularly movably supported on a boat hull and a tilt cylinder unit operatively coupled between brackets joined to the outboard engine and the boat hull, the tilt cylinder unit having a tilt lock function. Such an outboard engine assembly is disclosed in U.S. Pat. No. 4,925,411 and Japanese patent publication No. 2-58155.

As shown in FIG. 1 of the accompanying drawings, the tilt cylinder unit disclosed in U.S. Pat. No. 4,925,411 has a piston 101 fixed to an end of a rod 100 and slidably fitted in a cylinder 105. The piston 101 divides the interior space of the cylinder 105 into a first chamber S1 which is expanded when the tilt cylinder unit is extended and a second chamber S2 which is compressed when the tilt cylinder unit is contracted. The rod 100 extends through the second chamber S2. These chambers S1, S2 are interconnected by a communication passage 103 having an on-off valve 102. The piston 101 has a check valve 104 which interconnects the chambers S1, S2. When a large force is applied to the tilt cylinder unit, the check valve 104 is opened to allow working oil to flow from the second chamber S2 into the first chamber S1. A gas G is filled in the second chamber S2 to compensate for a change in the volume of the second chamber S2 as the rod 100 moves into and out of the second chamber S2. When the outboard engine is operated to propel the motorboat forwardly with the on-off valve 102 closed, since the working oil in the first chamber S1 is completely locked, the tilt cylinder unit is not contracted, and the outboard engine is kept at a certain constant angle with respect to the boat hull. However, when the outboard engine is operated to reverse the motorboat with the on-off valve 102 closed, since the outboard engine tends to move backwards in an upward direction, the tilt cylinder unit is subjected to a force tending to extend the tilt cylinder unit. At this time, the gas G filled in the second chamber S2 is compressed, permitting the outboard engine to be displaced for an interval corresponding to the amount by which the gas G is compressed.

The tilt cylinder unit disclosed in Japanese patent publication No. 2-58155 is shown in FIG. 2 of the accompanying drawings. The disclosed tilt cylinder unit differs from the tilt cylinder unit shown in FIG. 1 in that a gas G is filled in the first chamber S1. When the outboard engine is operated to reverse the motorboat forwardly with the on-off valve 102 closed, since the working oil in the second chamber S2 is completely locked, the tilt cylinder unit is not contracted, keeping the outboard engine at a certain constant angle with respect to the boat hull. However, when the outboard engine is operated to propel the motorboat forwardly, especially in shallows, the gas G in the first chamber S1 is compressed and exerts a resilient reactive force against forces tending to contract the tilt cylinder unit. At this time, the outboard engine is caused to bounce and becomes positionally unstable.

SUMMARY OF THE INVENTION

It is an object of the present invention to provide a tilt cylinder unit for an outboard engine, which prevents the outboard engine from being unduly lifted when a motorboat is reversed and which also prevents a filled gas from exerting resilient reactive forces when the motorboat runs in shallows.

According to the present invention, there is provided a tilt cylinder unit for use with an outboard engine on a boat hull, comprising a cylinder, a piston slidably disposed in the cylinder, a rod having an end coupled to the piston, one of the cylinder and the rod being adapted to be coupled to the outboard engine and the other being adapted to be coupled to the boat hull, the cylinder having a first chamber which is expanded when the tilt cylinder unit is extended and a second chamber which is compressed when the tilt cylinder unit is contracted, the first and second chambers being defined in the cylinder by the piston, a third chamber having a portion filled with a gas, an orifice interconnecting the second and third chambers, a plurality of communication passages interconnecting the first, second, and third chambers, and a manually operable valve coupled between the communication passages for selectively opening and closing the communication passages simultaneously.

The rod may be coupled to the outboard engine and the cylinder may be coupled to the boat hull. Alternatively, the rod may be coupled to the boat hull and the cylinder may be coupled to the outboard engine.

The tilt cylinder unit may further comprise an auxiliary tank separate from the cylinder, the third chamber being defined in the auxiliary tank.

The communication passages are defined in a wall of the cylinder, the manually operable valve comprising a tubular case fitted in a cavity defined in the wall and having openings communicating with the communication passages, respectively, and a control rod axially movably disposed in the tubular case for selectively bringing the communication passages into and out of communication with each other.

The manually operable valve has spring means for normally biasing the control rod in a direction to keep the communication passages out of communication with each other.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
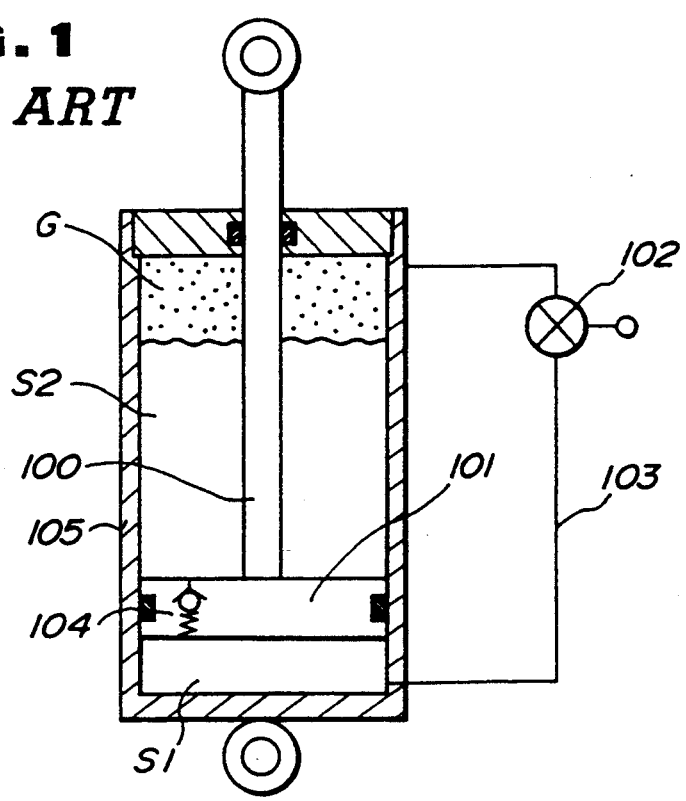
FIG. 1 is a schematic cross-sectional view of a conventional tilt cylinder unit.
Figure 2:
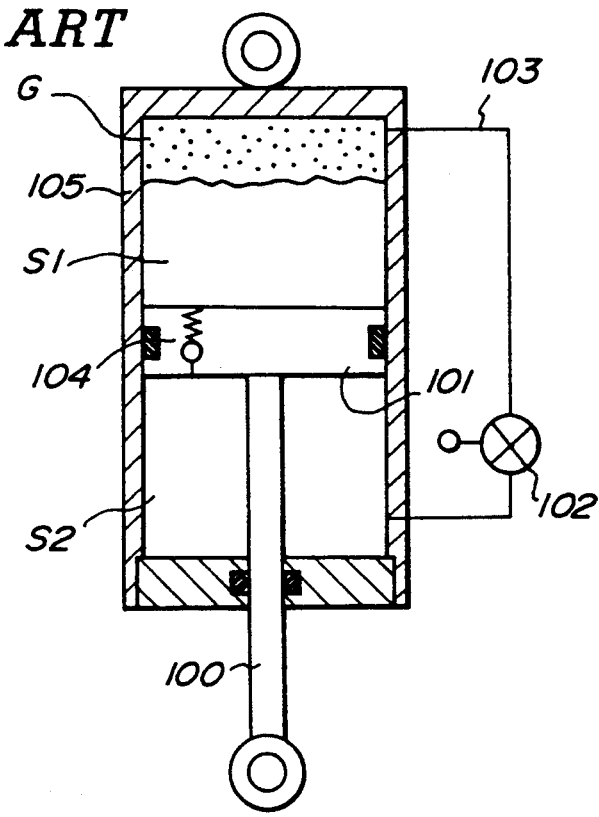
FIG. 2 is a schematic cross-sectional view of another conventional tilt cylinder unit.
Figure 3:
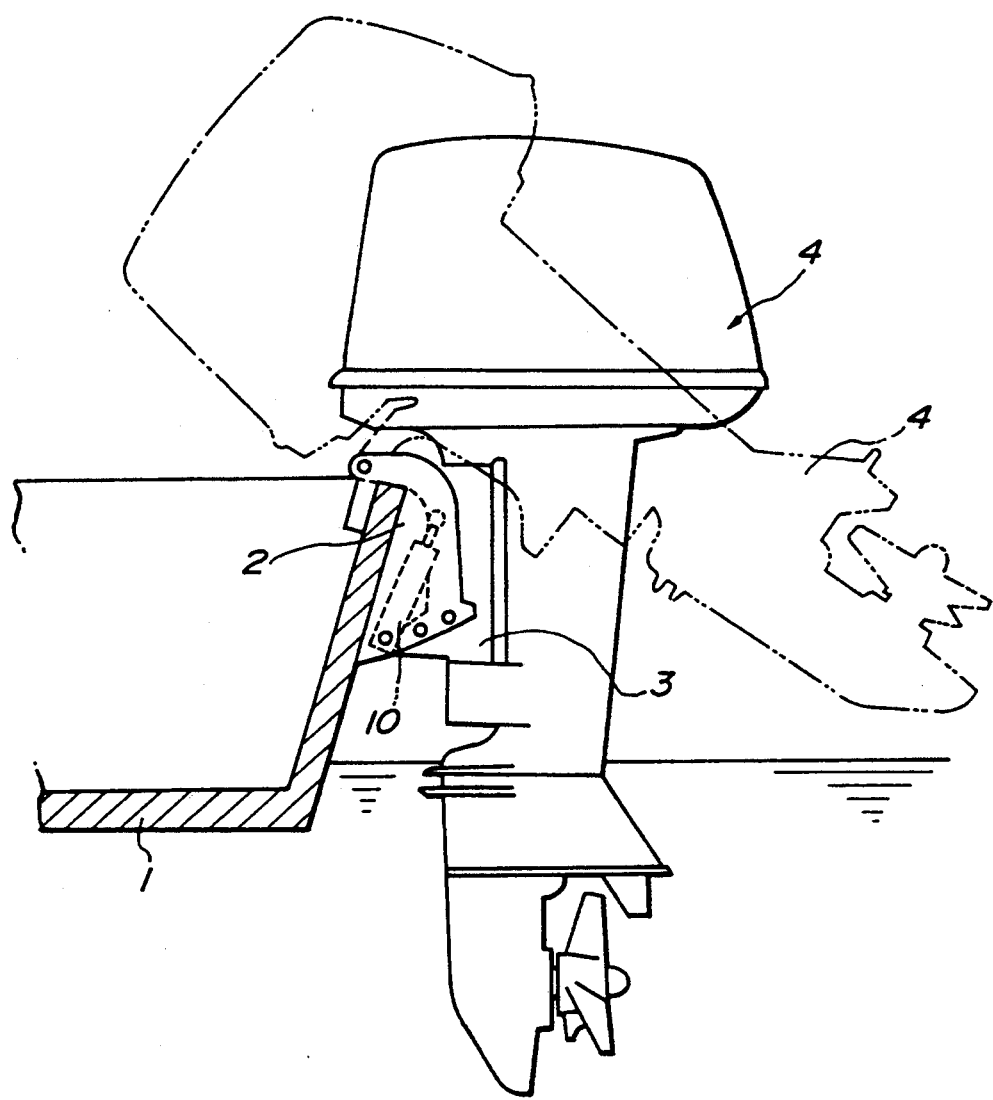
FIG. 3 is a side elevational view, partly in cross section, of an outboard engine mounted on the stern of a motorboat and combined with a tilt cylinder unit according to an embodiment of the present invention.

As shown in FIG. 3, a motorboat has a boat hull 1 with a clamp bracket 2 fixedly mounted on the stern thereof. To the clamp bracket 2, there is vertically angularly movably supported a swivel bracket 3 which supports an outboard engine 4. A tilt cylinder unit 10 is operatively coupled between the clamp and swivel brackets 2, 3.

Figure 4:
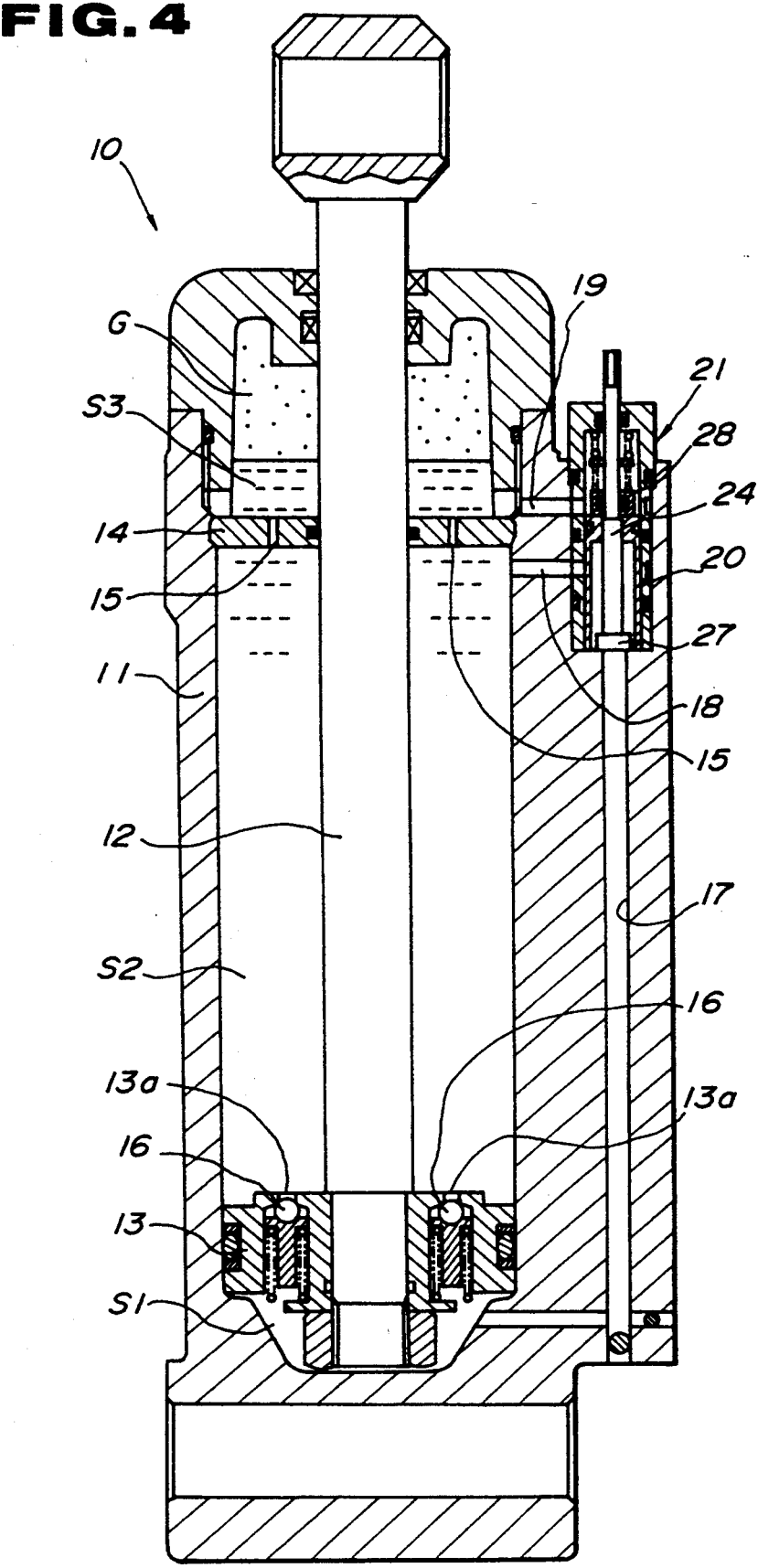
FIG. 4 is an enlarged longitudinal cross-sectional view of the tilt cylinder unit shown in FIG. 3.

As shown in FIG. 4, the tilt cylinder unit 10 has a cylinder 11, a rod 12 movably inserted longitudinally in the cylinder 11, and a piston 13 fixed to an inner end of the rod 12 and held in sliding contact with an inner surface of the cylinder 11. The cylinder 11 is coupled to the clamp bracket 2 and hence the boat hull, and the rod 12 is coupled to the swivel bracket 3 and hence the outboard engine 4. The piston 13 divides the interior space of the cylinder 11 into a first chamber S1 which is expanded when the tilt cylinder unit is extended and a second chamber S2 which is expanded when the tilt cylinder unit is contracted. The rod 12 extends through the second chamber S2. The cylinder 11 has a third chamber S3 defined above a partition 14 positioned in an upper portion of the second chamber S2 and extending across the rod 12. The third chamber S3 communicates with the second chamber S2 through orifices 15 defined in the partition 14. A gas G is filled in an upper portion of the third chamber S3. The first, second, and third chambers S1, S2, S3 are supplied with working oil.

The piston 13 has oil passages 13a defined axially therethrough and communicating between the first and second chambers S1, S2. Check valves 16 are disposed respectively in the oil passages 13a. When a large force is applied to the outboard engine 4 by a heavy object such as a floating piece of wood while the motorboat is running, the check valve 16 is opened to lessen the shock imposed on the tilt cylinder unit 10.

The cylinder 11 has a communication passage 17 defined in its wall and having an end opening into the first chamber S1, a communication passage 18 defined in its wall and having an end opening into the second chamber S2, and a communication passage 19 defined in its wall and having an end opening into the third chamber S3. These communication passages 17, 18, 19 have opposite ends opening into an upwardly open, vertical cavity 20 defined in the wall of the cylinder 11 laterally of the partition 14. A manually operable valve 21 is disposed in the cavity 20 for simultaneously opening or closing the communication passages 17, 18, 19.

Figure 5:
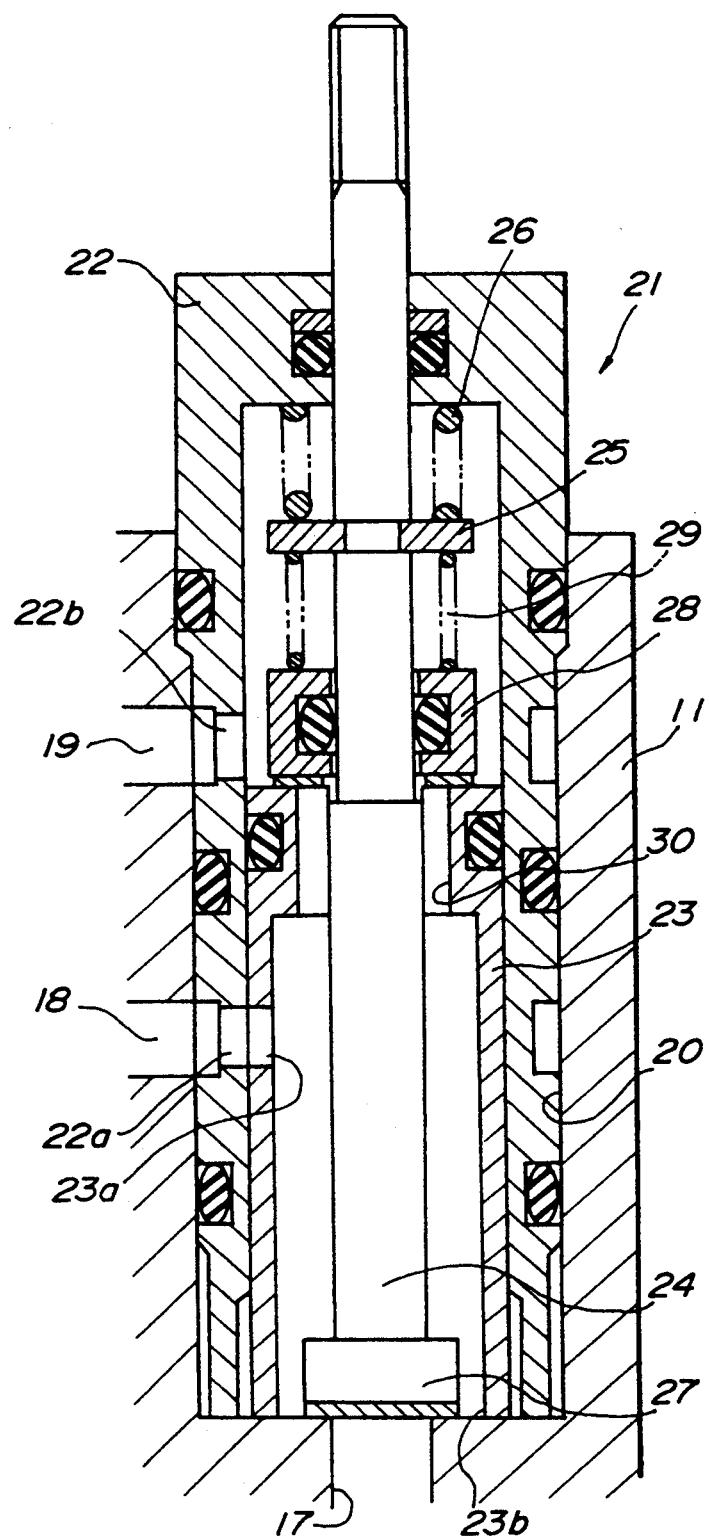
FIG. 5 is an enlarged cross-sectional view of a manually operable valve of the tilt cylinder unit shown in FIG. 4, the manually operated valve being closed.
Figure 6:
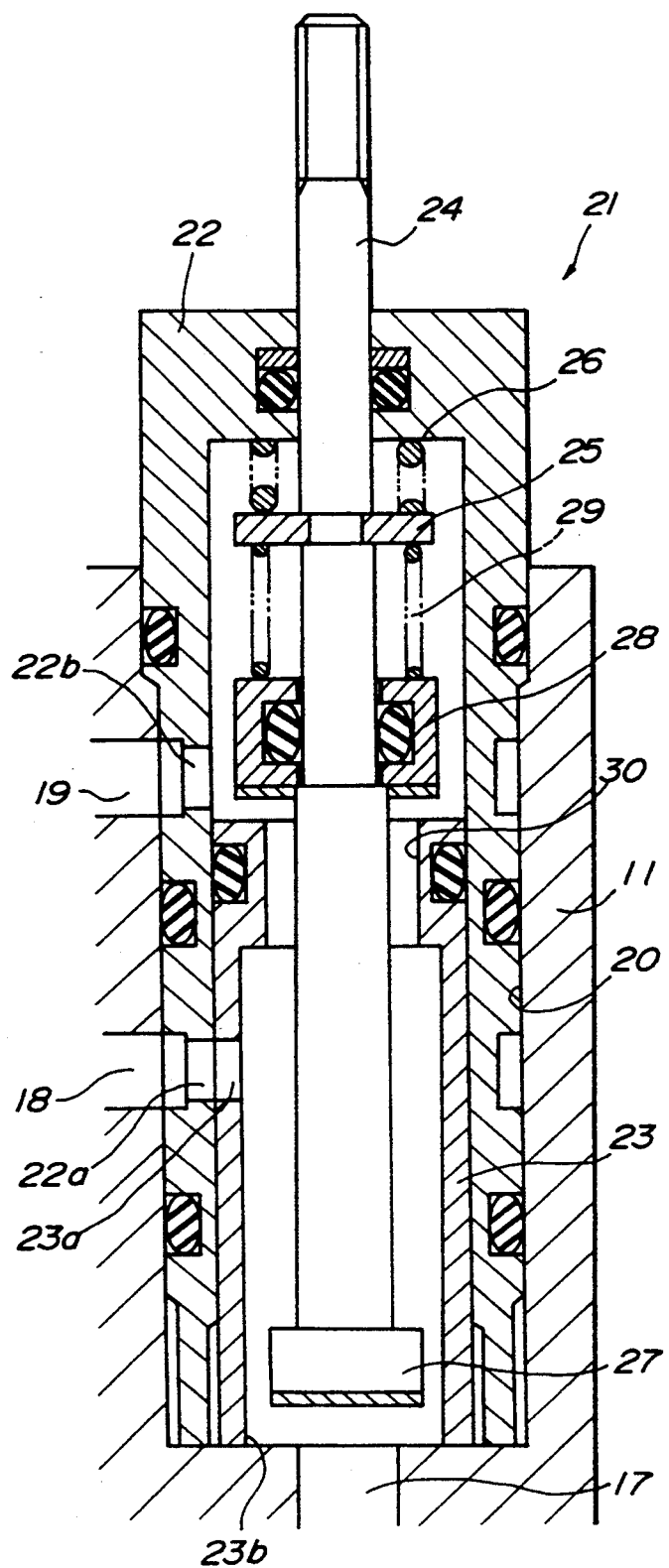
FIG. 6 is an enlarged cross-sectional view of the manually operable valve shown in FIG. 5, which is open.

As shown in FIGS. 5 and 6, the manually operable valve 21 comprises a tubular case 22 fitted within the cavity 20 and having a closed upper end and an open lower end. The tubular case 22 has an opening 22a defined in a side wall thereof in communication with the communication passage 18 and an opening 22b, and an opening 22b defined in the side wall thereof upwardly of the opening 22a in communication with the communication passage 19. The manually operable valve 21 also has a tubular valve seat 23 disposed in the tubular case 22 and having an upper end positioned immediately below the opening 22b. The tubular valve seat 23 has an opening 23a defined in its side wall in communication with the opening 22a, an opening 23b defined in its lower end and communicating with the communication passage 17, and an opening 30 defined in its upper end.

The manually operable valve 21 further has a control rod 24 extending vertically through the tubular valve seat 23 and the tubular case 22 and having an upper end projecting above the tubular case 22. The control rod 24 loosely extends through the opening 30 of the tubular valve seat 23. A valve 27 is fixed to the lower end of the control rod 24 within the tubular valve seat 23. A spring seat 25 is secured to a reduced-diameter upper portion of the control rod 24 in the tubular case 22 above the tubular valve seat 23. A spring 26 is disposed under compression around the control rod 24 axially between the spring seat 25 and an inner surface of the upper end of the tubular case 22, for normally biasing the control rod 24 downwardly in a direction to cause the valve 27 on the lower end of the control rod 24 to close the communication passage 17.

The reduced-diameter upper portion of the control rod 24 supports a valve 28 disposed slidably thereon. The valve 28 is normally biased downwardly in a direction to close the opening 30 of the tubular valve seat 23 by a spring 29 that is disposed under compression around the control rod 24 between the spring seat 25 and the valve 28.

The tilt cylinder unit shown in FIGS. 3 through 6 operates as follows:

To manually move the outboard engine 4 upwardly or downwardly, the manually operable valve 21 is opened as shown in FIG. 6. When the outboard engine 4 is pulled upwardly, working oil in the second chamber S2 flows through the communication passage 18, the manually operable valve 21, and the communication passage 17 into the first chamber S1. At this time, the amount of working oil which is equal to the volume of the portion of the rod 12 that is displaced out of the cylinder 11 is supplied from the third chamber S3 through the communication passage 19, the manually operable valve 21, and the communication passage 17 into the first chamber S1.

When the outboard engine 4 is lowered with the manually operable valve 21 being open, working oil in the first chamber S1 flows through the communication passage 17, the manually operable valve 21, and the communication passage 18 into the second chamber S2. At this time, the amount of working oil which is equal to the volume of the portion of the rod 12 that is displaced into the cylinder 11 is supplied from the first chamber S1 through the communication passage 17, the manually operable valve 21, and the communication passage 19 into the third chamber S3.

When the motorboat is to run forwardly in sufficiently deep waters, the manually operable valve 21 is opened. Since the outboard engine 4 is pressed toward the boat hull under propulsive forces produced thereby, it is not necessary to close the manually operable valve 21 and adjust the angle of the outboard engine 4.

When the motorboat is to be reversed or run forwardly in shallows, the manually operable valve 21 is closed as shown in FIG. 5. Upon reversing movement of the motorboat, forces are applied which tend to extend the tilt cylinder unit 10. Since, however, the communication passages 17, 18, 19 are closed by the manually operable valve 21, the tilt cylinder unit 10 is extended very gradually at a rate corresponding to the amount of working oil that flows from the second chamber S2 through the orifices 15 into the third chamber S3. Therefore, the outboard engine 4 is prevented from being unduly lifted. Upon forward movement of the motorboat in shallows, the working oil in the first chamber S1 is fully locked, allowing the outboard engine 4 to be kept at a desired angle with respect to the boat hull. The outboard engine 4 is prevented from suffering resilient reactive forces from the gas G.

Figure 7:
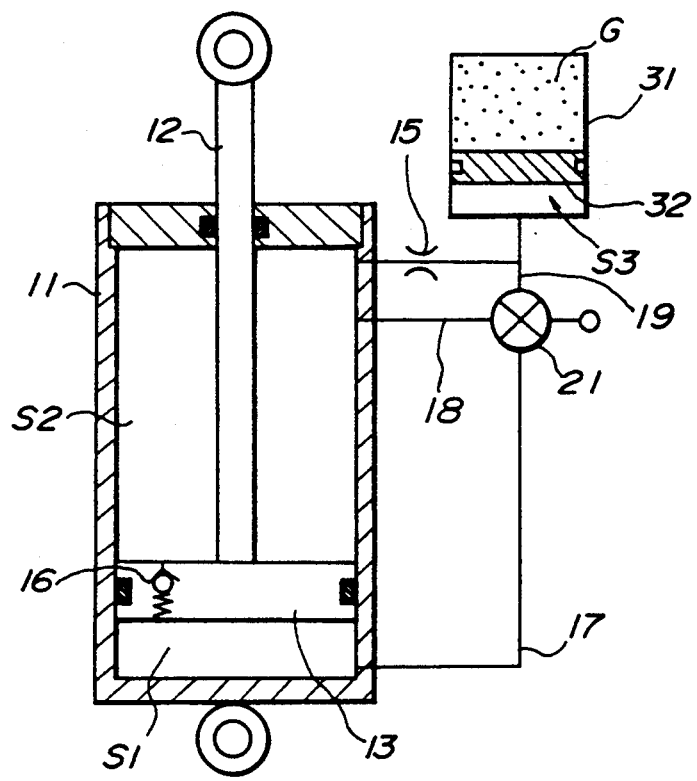
FIG. 7 is a schematic cross-sectional view of a tilt cylinder unit according to another embodiment of the present invention.

FIG. 7 shows a tilt cylinder unit according to another embodiment of the present invention. As shown in FIG. 7, the tilt cylinder unit has a piston 13 fixed to an end of a rod 12 and slidably fitted in a cylinder 11. The rod 12 is coupled to an outboard engine, and the cylinder 11 is coupled to a boat hull. The piston 13 divides the interior space of the cylinder 11 into a first chamber S1 which is expanded when the tilt cylinder unit is extended and a second chamber S2 which is compressed when the tilt cylinder unit is contracted. The piston 13 has a check valve 16 for allowing working oil to flow from the second chamber S2 into the first chamber S1. The chambers S1, S2 are interconnected by communication passages 17, 18, 19 which are connected to a manually operable on-off valve 21. The communication passage 19 has an orifice 15. An auxiliary tank 31, separate from the cylinder 11, defines a third chamber S3 therein which is connected to the communication passage 19. The auxiliary tank 31 has a freely movable piston 32 disposed in the third chamber S3, and a portion of the third chamber S3 above the freely movable piston 32 is filled with a gas G in the auxiliary tank 31.

Figure 8:
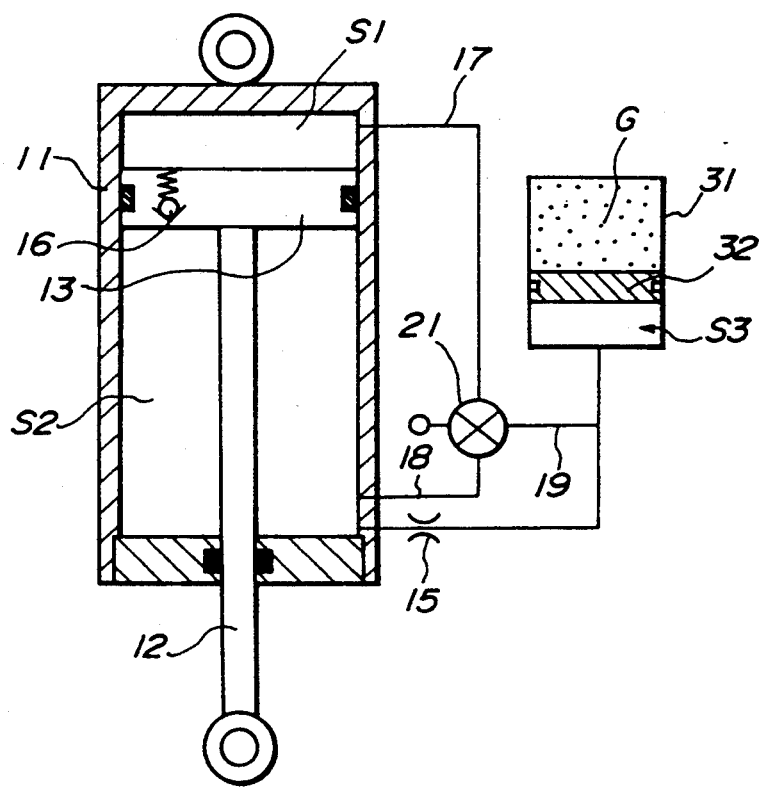
FIG. 8 is a schematic cross-sectional view of a tilt cylinder unit according to still another embodiment of the present invention.

FIG. 8 shows a tilt cylinder unit according to still another embodiment of the present invention. As shown in FIG. 8, the tilt cylinder unit has a piston 13 fixed to an end of a rod 12 and slidably fitted in a cylinder 11. The rod 12 is coupled to a boat hull, and the cylinder 11 is coupled to an outboard engine. The piston 13 divides the interior space of the cylinder 11 into a first chamber S1 which is expanded when the tilt cylinder unit is extended and a second chamber S2 which is compressed when the tilt cylinder unit is contracted. The piston 13 has a check valve 16 for allowing working oil to flow from the second chamber S2 into the first chamber S1. The chambers S1, S2 are interconnected by communication passages 17, 18, 19 which are connected to a manually operable on-off valve 21. The communication passage 19 has an orifice 15. An auxiliary tank 31, separate from the cylinder 11, defines a third chamber S3 therein which is connected to the communication passage 19. The auxiliary tank 31 has a freely movable piston 32 disposed in the third chamber S3, and a portion of the third chamber S3 above the freely movable piston 32 is filled with a gas G in the auxiliary tank 31.

In each of the embodiments shown in FIGS. 7 and 8, the second and third chambers S2, S3 are held in communication with each other through the orifice 15. Therefore, when the motorboat is reversed or runs in shallows, the outboard engine 4 is prevented from being unduly lifted or displaced.

Although there have been described what are at present considered to be the preferred embodiments of the invention, it will be understood that the invention may be embodied in other specific forms without departing from the essential characteristics thereof. The present embodiments are therefore to be considered in all respects as illustrative, and not restrictive. The scope of the invention is indicated by the appended claims rather than by the foregoing description.

What is claimed is:

1. A tilt cylinder unit for use with an outboard engine on a boat hull, comprising:
    a cylinder;
    a piston slidably disposed in said cylinder;
    a rod having an end coupled to said piston;
    one of said cylinder and said rod being adapted to be coupled to the outboard engine and the other being adapted to be coupled to the boat hull;
    said cylinder having a first chamber which is expanded when the tilt cylinder unit is extended and which is compressed when the tilt cylinder unit is contracted, said first and second chambers being defined in said cylinder by said piston;
    a third chamber having a portion filled with a gas;
    an orifice interconnecting said second and third chamber;
    a plurality of communication passages interconnecting said first, second, and third chambers; and
    a manually operable valve coupled between said communication passages for selectively opening and closing said communication passages simultaneously;
    wherein said communication passages are defined in a wall of said cylinder, said manually operable valve comprising a tubular case fitted in a cavity defined in said wall and having openings communicating with said communication passages, respectively, and a control rod axially movably disposed in said tubular case for selectively bringing said communication passages into and out of communication with each other.

2. A tilt cylinder unit according to claim 1, wherein said manually operable valve has spring means for normally biasing said control rod in a direction to keep said communication passages out of communication with each other.

3. A tilt cylinder unit for use with an outboard engine on a boat hull, comprising:
    a cylinder;
    a piston slidably disposed in said cylinder;
    a rod having an end coupled to said piston;
    one of said cylinder and said rod being adapted to be coupled to the outboard engine and the other being adapted to be coupled to the boat hull;
    said cylinder having a first chamber which is expanded when the tilt cylinder unit is extended and which is compressed when the tilt cylinder unit is contracted, said first and second chambers being defined in said cylinder by said piston;
    a third chamber having a portion filled with a gas;
    an orifice interconnecting said second and third chamber;
    a plurality of communication passages interconnecting said first, second, and third chambers; and
    a manually operable valve coupled between said communication passages for selectively opening and closing said communication passages simultaneously;
    said communication passages are defined in a wall of said cylinder and have openings communicating with said communication passages, respectively, and
    a control member for selectively bringing said communication passages into and out of communication with each other.

4. A tilt cylinder unit according to claim 3, further comprising
    a control rod slidably disposed in said wall of said cylinder for bringing said passages into and out of communication with each other.

* * * * *